United States Patent [19]
Lee

[11] Patent Number: 5,557,575
[45] Date of Patent: Sep. 17, 1996

[54] LOOK AHEAD FLAG FOR FIFO

[75] Inventor: Tsu-Wei F. Lee, Monte Sereno, Calif.

[73] Assignee: Paradigm Technology, Inc., San Jose, Calif.

[21] Appl. No.: 377,890

[22] Filed: Jan. 24, 1995

Related U.S. Application Data

[62] Division of Ser. No. 981,158, Nov. 23, 1992, Pat. No. 5,384,744.

[51] Int. Cl.$^6$ ................................................ G11C 7/00
[52] U.S. Cl. .................... 365/221; 365/236; 365/239; 365/189.02; 365/189.07
[58] Field of Search .................................. 365/221, 236, 365/239, 189.02, 189.07

[56] References Cited

U.S. PATENT DOCUMENTS

| | | | |
|---|---|---|---|
| 4,888,741 | 12/1989 | Malinowski | 365/230.05 |
| 5,084,841 | 1/1992 | Williams et al. | 365/189.07 |
| 5,121,346 | 6/1992 | McClure | 364/550 |
| 5,206,817 | 4/1993 | McClure | 364/550 |
| 5,214,607 | 5/1993 | Duzan | 365/221 |
| 5,267,191 | 11/1993 | Simpson | 365/78 |
| 5,388,074 | 2/1995 | Buckenmaier | 365/189.05 |

*Primary Examiner*—David C. Nelms
*Assistant Examiner*—Andrew Q. Tran
*Attorney, Agent, or Firm*—Skjerven, Morrill, MacPherson, Franklin & Friel; Norman R. Klivans; David T. Millers

[57] ABSTRACT

The invention provides fast generation of flag signals for devices such as a first-in first-out buffers by looking ahead and predetermining flag signals for future possible states of the device. Predetermining flag signals does not delay flag output because the required calculations are completed before the flag signal is needed. The flag signal can be changed when needed as quickly as a multiplexer can switch from an old flag signal to a predetermined flag signal. The switching time of a multiplexer is shorter than the comparator delays in prior art flag generators.

19 Claims, 5 Drawing Sheets

LOOK AHEAD FLAG FOR FIFO

This application is a division of application Ser. No. 07/981,158, filed Nov. 23, 1992, now U.S. Pat. No. 5,384,744.

BACKGROUND OF THE INVENTION

1. Field of the Invention

The present invention relates to the setting of flag signals which indicate the status of a device such as a first-in first-out buffer.

2. Description of Related Art

A first-in first-out (FIFO) buffer often is useful between devices with different clock frequencies. In typical operation of a FIFO, a first device, such as micro-processor writes to the FIFO buffer and a second device, such as a peripheral or a second microprocessor, reads from the FIFO buffer. Each device reads or writes according to its own clock. Because two different clocks control the timing of read and write operations, the buffer handles the operations asynchronously, and the devices may write then read with a very short time separation.

To maximize data flow the FIFO buffer must be ready to respond to the next operation quickly. Any processing time required between one operation and a subsequent operation can delay the subsequent operation and slow the rate of data flow through the buffer. In particular, the time that the buffer takes to recalculate status flags after an action by one processor tends to slows down the buffer.

Figure 1:
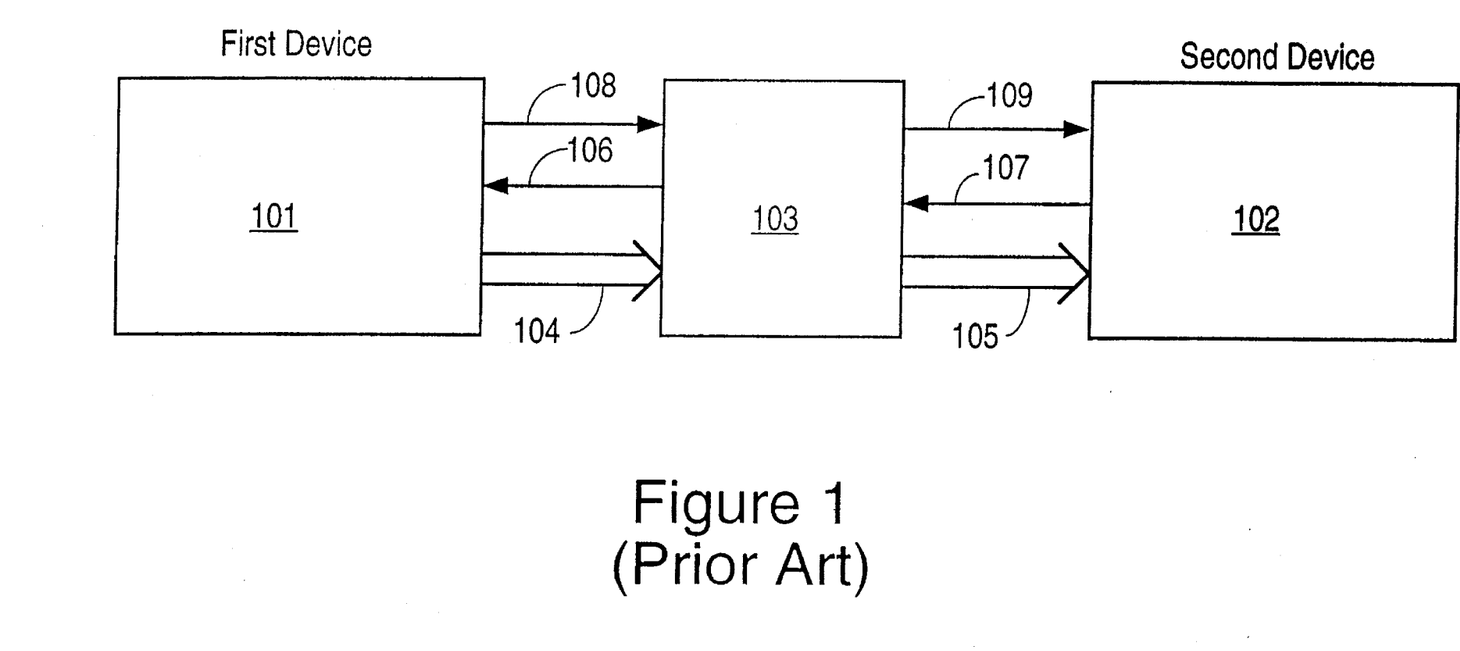
FIG. 1 shows a diagram of a typical FIFO buffer attached to two devices.

FIG. 1 show a typical application of a FIFO buffer 103. The FIFO buffer 103 holds data that is written to the buffer 103 by a first device 101 and read from the buffer 103 by a second device 102. Besides holding the data, the buffer 103 sends flag signals to the attached devices 101 and 102. For example the buffer 103 could send a full signal to the first device on a flag line 106 when the buffer is full, or could send an empty signal to the second device 102 on line 107 when the buffer is empty.

When the first device 101 has data to write to the buffer 103, the first device 101 checks for the full flag signal on line 106. If the flag signal indicates the buffer 103 is full the first device 101 must wait before sending data to buffer 103. If the buffer 103 is not full the first device 101 asserts data signals to the data lines 104 and sends a write clock or control signal to the buffer 103 on a line 108. The buffer 103 stores the data in a memory location pointed to by a write pointer and then increments the write pointer.

When data is in the buffer 103 the buffer 103 clears the empty signal on line 107, which indicates to the second device 102 that data is available to be read from the buffer 103. The second device 102 sends a clock or control signal to the buffer 103 on line 109, and the buffer 103 asserts to data lines 105 the data pointed to by a read pointer. After the second device 102 reads the data, the buffer 103 increments the read pointer.

With this architecture if the read pointer and the write pointer point to the same location then the FIFO buffer is either empty or full. It is full if enough data has been written so that the write pointer has just incremented to equal the read pointer. It is empty if the read pointer has just incremented to equal the write pointer. The FIFO buffer needs to signal these two conditions to the devices connected to the buffer.

When the two devices connected to a FIFO buffer do not have synchronized clocks, reads and writes to the buffer occur asynchronously, so the read pointer and write pointer change asynchronously. Still, when one of the devices connected to the buffer takes an action, the various status flags need to be changed to reflect the new values of the pointers. The devices connected to the buffer either wait while the new flags are calculated or take actions based on incorrect flags. The speed of the FIFO buffer, therefore, may be limited by the speed of flag output. If the speed of the flag output is improved then the speed of the FIFO can be improved.

In a FIFO buffer, flag output is normally generated from the values of the two pointers. For example, immediately after a device writes data to the buffer the read pointer may point to location i and the write pointer may point to location j. The full flag needs to be activated if the two pointers point to the same location, i.e. i=j. In typical prior art architecture, the FIFO buffer would compare the two pointer values and generate the flag signal for the connected device to act on. The connected devices normally have to wait the time it takes the comparator to generate a flag signal. Accordingly, a need exists to reduce or eliminate this wait and thereby speed up the operation of the system including the FIFO buffer.

SUMMARY OF THE INVENTION

Embodiments of the present invention speed up a flag output from a FIFO buffer by looking ahead and predetermining possible new flag signals. When the state of the FIFO buffer changes, the buffer switches the flag output from the old signal to one of the predetermined flag signals. The FIFO buffer is ready to handle data as soon as the flag output is switched. Generally, switching time is considerably shorter than the time for a comparator to calculate a new flag value. The faster response decreases the time that flag signals incorrectly indicate the state of the FIFO buffer. Calculating all possible next flag signals does not delay device actions because the possible flag signals are calculated ahead of time.

Embodiments of the invention described in detail below include a look ahead signal generator which generates four flags signals. One of the flag signals is the current flag signal corresponding to the current state of the FIFO buffer. The other three signals correspond to possible states that the buffer would have after one read, or one write, or one read and one write. These three states are the only states that can be reached by read and/or write operations within a time interval less than the shortest clock period of devices attached to the buffer. Any other state of the buffer takes more than a clock period to reach.

For example, reaching a state that occurs after two writes takes at least one clock period of the device writing to the buffer. The buffer cannot predict when a write will occur. However, because write operations are controlled by the clock of the writing device, after a first write operation occurs, a second write operation comes at the soonest in the next clock cycle of the writing device. The flag generator uses the time between the first write and the second write to predetermine the flag corresponding to the state the buffer would have after the second write.

The four flag signals are connected to the inputs of a signal selector. In some embodiments, the signal selector is just a multiplexer. The signal selector chooses as an output signal the flag signal corresponding to the current state of the FIFO buffer. When a device reads or writes to the buffer, the multiplexer passes the predetermined flag signal corresponding to the new current state of the FIFO buffer. The flag generator then calculates possible new flag signals based on the new current state. Since the previously generated possible states includes all of the states that could be reached within the shortest clock period of a device attached to the FIFO buffer, the flag generator has at least a clock cycle to calculate new possible flag signals. The flag signals change as quickly as the signal selector can select an output signal.

The look ahead signal generator in some embodiments of the invention employs a method which quickly determines half full, almost full, or almost empty flags. Half full flags and almost full flags indicate whether the buffer is more than half full or is almost full. Almost empty flags indicate whether the buffer is almost empty. The method does a single subtraction of the current value of the read pointer from the current value of the write pointer. The values of the status flags for the current state of the buffer and the three possible new states are generated using arithmetic relationships between the possible pointer values.

This invention will be more fully understood in light of the following detailed description taken together with the drawings.

DETAILED DESCRIPTION OF THE PREFERRED EMBODIMENTS

Embodiments of the invention described here provide fast generation of flag signals by predetermining a set of possible flag signals for possible future states and switching to the appropriate predetermined signal when the state changes. An embodiment of the invention can be used with the FIFO buffer described above to generate the flag signals for a current state and for future possible states.

One way to name the states of a FIFO buffer is by the values of the read and the write pointers. If the current value of the read pointer is i and the current value of the write pointer is j, the current state of the buffer can be referred to as (i,j).

The look ahead signal generator generates a flag signal for the current state (i,j) and for three possible new states (i,j+1), (i+1,j), and (i+1,j+1). These are the four states that can be reached in less than a clock cycle as described above and therefore need to be generated ahead of time to prevent delays.

Another way to name the four states is according to whether the read pointer and write pointer values are even or odd. Flag signals can be generated for the four states (even read, even write), (odd read, even write), (even read, odd write), and (odd read, odd write). Any of these four state could be the current state depending on the values of i and j. If i and j are both even then the current state (i,j) is (even read, even write), (i,j+1) is (even read, odd write), (i+1, j) is (odd read, even write), and (i+1,j+1) is (odd read, odd write). If i and j are both odd the current state (i,j) is (odd read, odd write), etc.

Figure 2:
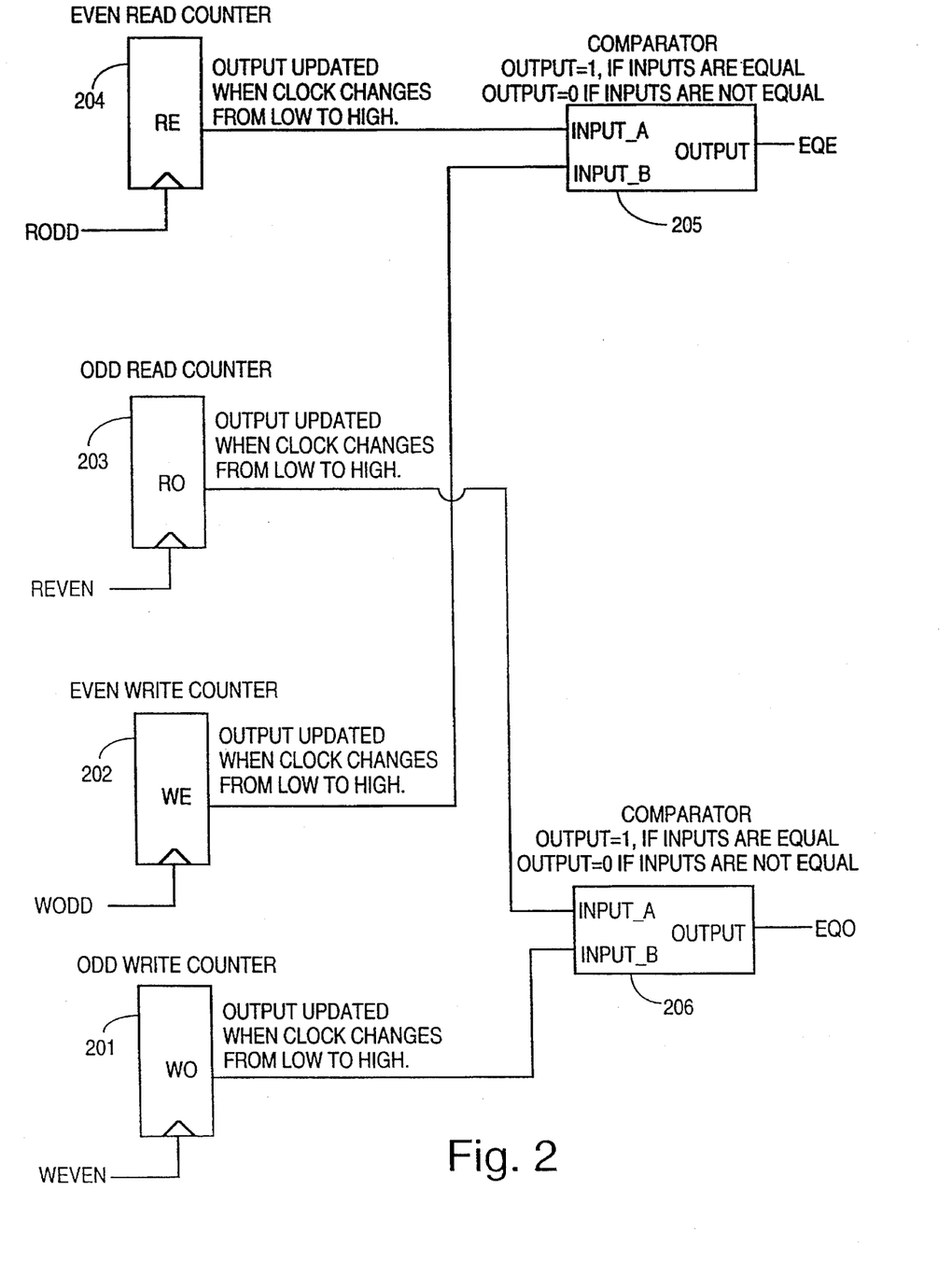
FIG. 2 shows a block diagram of an embodiment of a look ahead signal generator.

FIG. 2 shows a circuit diagram of part of a look ahead signal generator used to generate either a full flag signal or an empty flag signal. The circuit shown generates flag signals EQE and EQO for the states (even read, even write) and (odd read, odd write). The flag signals for (even read, odd write) and (odd read, even write) are always low in the full flag or empty flag case because an even number can never equal an odd number.

An even read counter 204 holds an even value corresponding to either i or i+1. If i is even, read counter 204 holds the value i. If i is odd, read counter 204 holds the value i+1. An odd read counter 203 holds an odd value corresponding to i+1 or i (if i is odd, counter 203 holds i; if i is even, counter 203 holds i+1). In the same way, an even write counter 202 holds an even value corresponding to j or j+1 and an odd write counter 201 holds an odd value corresponding to j+1 or j.

Comparator 205 compares the value in the even read counter 204 to the value in the even write counter 202 and generates the flag signal EQE for the state (even read, even write). Comparator 206 similarly compares the values in the odd read counter 203 to the value in the odd write counter 201 and generates the flag signal EQO for the state (odd read, odd write). Again, no calculation is necessary for the state (even read, odd write) or (odd read, even write) because an even value can never equal an odd value, and the flags for (even read, odd write) or (odd read, even write) should never indicate a full or empty buffer.

Figure 3:
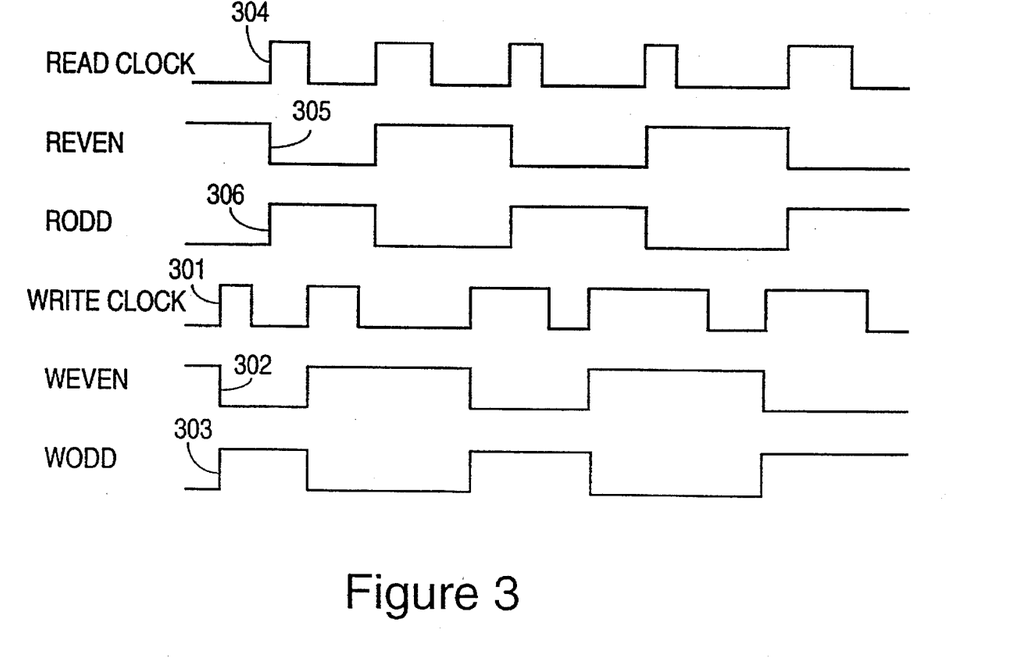
FIG. 3 is a timing diagram showing signals that control the operation of the look ahead signal generator of FIG. 2 and the signal selector of FIG. 5.

Each of the counters 201–204 increments by 2 every time the counter is clocked. This keeps even counts even and odd counts odd. FIG. 3 shows a voltage verses time plot for a number of clock signals. A write clock signal is generated by the device that writes to the buffer. The buffer latches data from the data lines and increments the write pointer on the rising edge of the write clock signal. A read clock signal controls the reading of data by the second device. On a rising edge of the read clock signal the buffer increments the read pointer. REVEN (RODD) is a signal that is high when the value held in the read pointer is even (odd). WEVEN (WODD) is a signal that is high when the value held in the write pointer is even (odd).

Figure 4:
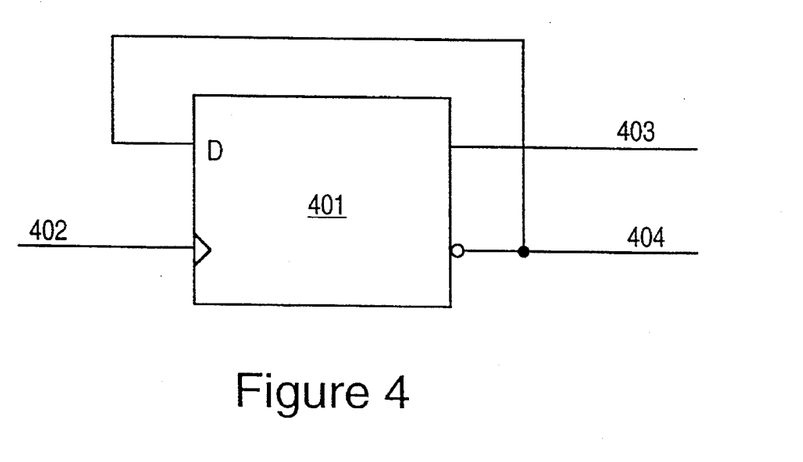
FIG. 4 shows a circuit diagram which may be used to generate signals REVEN and RODD from a read clock signal or WEVEN and WODD from a write clock signal.

The signals REVEN and RODD may be easily generated from the read clock signal using a D flip-flop 401 as shown in FIG. 4. The read clock signal is asserted to lead 402 and produces signals REVEN and RODD on leads 404 and 403. WEVEN and WODD are generated from the write clock signal in the same fashion using a structure the same as that shown in FIG. 4.

Again considering FIG. 3, on every rising edge of the read clock the read pointer increments and the signal REVEN changes voltage level. Initially REVEN is high, and the read pointer value is zero. Every time a read is done REVEN alternates between high and low, and the value of the read pointer alternates between even and odd. Thus, as stated above, signal REVEN indicates if the read counter is even.

Similarly, RODD indicates if the read counter is odd, and WEVEN and WODD respectively indicate if the write counter is even and odd.

At start up of the buffer, both pointer values are zero. Signals REVEN and WEVEN are high. Signals RODD and WODD are low. The even read counter 204, the odd read counter 203, the even write counter 202, and the odd write counter 201 hold values 0, 1, 0, and 1 respectively. The flag signal EQE indicates the read and write pointers are equal for the (even read, even write) state, and the flag signal EQO indicates the read and write pointers are equal for the (odd read, odd write) state.

If a write operation is performed just after start up the current state goes from (even read, even write) to (even read, odd write), and a signal selector switches the current flag output as will be described below. In FIG. 3 the rising edge 301 of the write clock signal signals a write operation. Signal WEVEN drops to low and signal WODD rises to high. The rising edge 303 of signal WODD clocks the even write counter 202 and the even write counter 202 increments by 2. As a result the even read counter 204, odd read counter 203, the even write counter 202, and the odd write counter 201 hold values 0, 1, 2, and 1 respectively. The comparator 205 now compares 0 and 2 and drops the EQE signal to low indicating the flag signal for (even read, even write) state.

There is a comparator delay time before the flag signal for (even read, even write) is ready. But the (even read, even write) flag is not needed immediately because the current values of the read and write pointers are 0 and 1. The current flag signal is the (even read, odd write) signal which was predetermined and is ready. The (even read, even write) signal would only be needed after a second write operation. Because successive write operations are separated in time by at least one clock cycle of the writing device, there is time for the comparator to complete its operation.

The next write operation causes the odd write counter to increment by 2, from 1 to 3. Subsequent write operations alternate between causing the even write and the odd write counter to increment by 2. Read operations cause exactly analogous increments of the even read and odd read counters.

Figure 5:
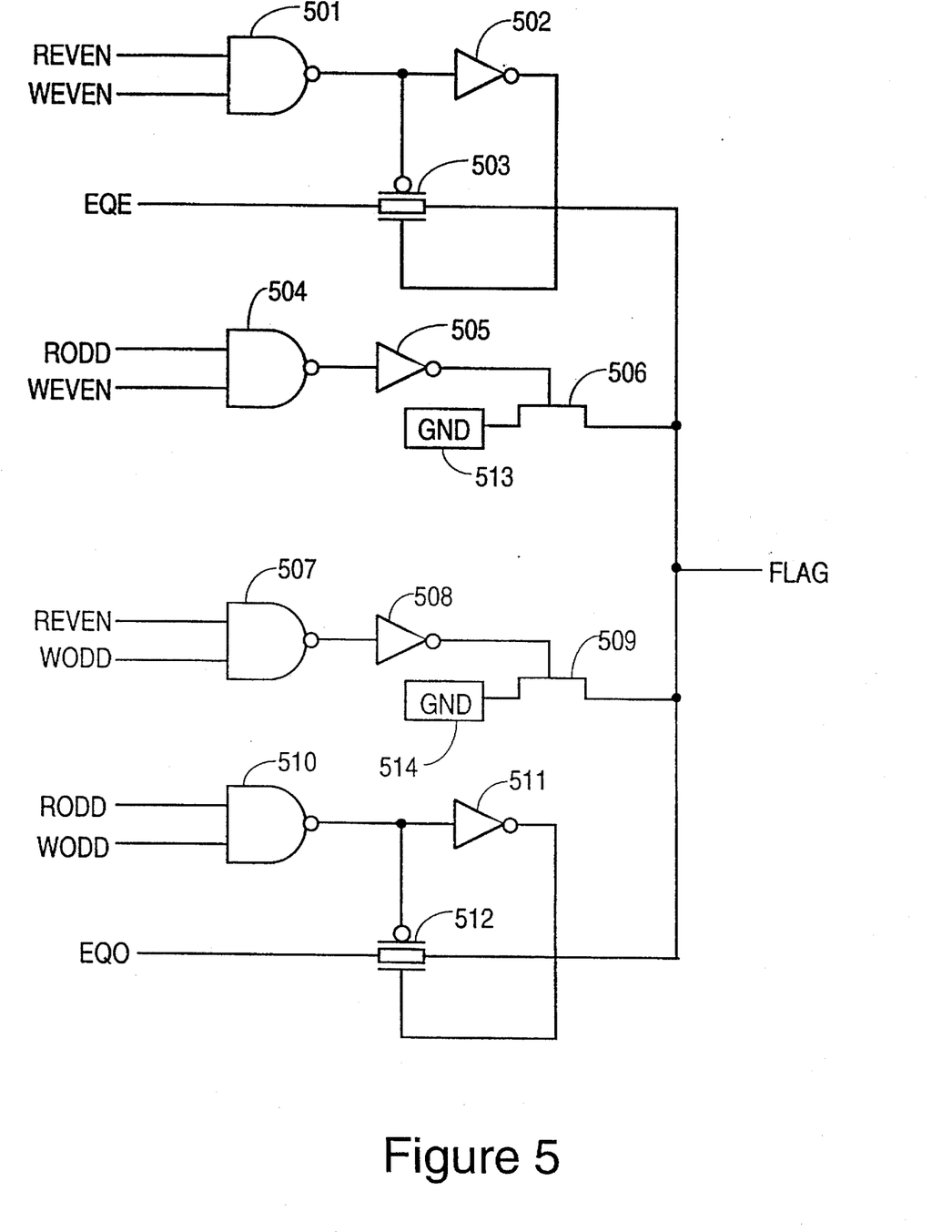
FIG. 5 shows a circuit diagram of a signal selector which takes the form of a multiplexer that may be use in conjunction with the circuit of FIG. 2.

The output signals EQE for the (even read, even write) state, EQO for the (odd read, odd write) state, and permanently low signals for (even read, odd write) and (odd read, even write) are input into a multiplexer which selects the correct signal for flag output. FIG. 5 shows a circuit diagram of a signal selector which in this embodiment is a typical multiplexer that uses the signals REVEN, RODD, WEVEN, and WODD to select the correct flag signal.

In FIG. 5 a NAND gate 501 and an inverter 502 activate pass gate 503 thereby making a signal FLAG equal to the signal EQE when both the read pointer and the write pointer are even. NAND gate 510 and an inverter 511 activate pass gate 512 thereby making a signal FLAG equal to the signal EQO when both the read pointer and the write pointer are odd. When the read pointer is odd and the write pointer is even output from NAND gate 504 is low, output from inverter 505 is high, and n channel transistor 506 switches on. The output signal FLAG is set to a reference voltage GND. Similarly NAND gate 507, inverter 508, and n channel transistor 509 set the signal FLAG to low when the read pointer is even and the write pointer is odd.

The signal flag is set whenever the read pointer and write pointer are equal. Making the signal FLAG an empty flag or a full flag requires additional circuitry that can be coupled to the FLAG output lead. There are many known ways to make the additional circuitry. One way is to combine the signal FLAG with a half full flag through an AND gate for a full flag. If the buffer is at least half full and the pointers are equal then the buffer is full. If the buffer is less than half full and the pointers are equal then the buffer is empty. Additional circuitry could alternatively check if the last operation was a write. If the last operation was a write to the buffer then there is data in the buffer. The read and write pointer being equal indicates the buffer is full, and the full flag should be set. Otherwise, the last operation must have been a read which emptied the buffer and the empty flag should be set.

Embodiments of the invention may also be used to generate flag signals that are set whenever the difference between the write pointer value and the read pointer value is less than, less than or equal to, greater than, greater than or equal to, or equal to any fixed value. For example a half full flag may be set whenever the buffer is more than half full, or an almost full flag may be set when the buffer is 90% full, or an almost empty flag may be set if the buffer is less than 10% full. To generate these flags, a flag generator needs to compare the difference between the pointer values to the fixed value.

For a half full flag or an almost full flag, if i and j are the current values of the read and write pointer, a flag needs to be set if $j-i$ is greater than a value C. For look ahead the current state and three possible future states need to be considered. The look ahead signal generator must determine if $j-(i+1)$, $(j+1)-i$, and $(j+1)-(i+1)$ are greater than C. Clearly, $j-i=(j+1)-(i+1)$ so states (i,j) and (i+1,j+1) always have the same flag signal, and only three states need to be considered. One method to calculate these flags is to do three multibit subtractions followed by three comparisons to C.

Another method only requires a single multibit subtraction. The subtraction calculates a number $X=j-i$ then relies on the relation $(j+1)-i>j-i>j-(i+1)$, and the fact that all four states have the same flag signal unless $j-i=C$ or $j-i=C+1$. If $j-i=C$ then the flag is not set for state (i,j) or state (i+1,j), but would be set for state (i,j+1). If $j-i=C+1$ the flag for states (i,j) and (i,j+1) would be set but the flags for (i+1,j) would not be set.

Figure 6:
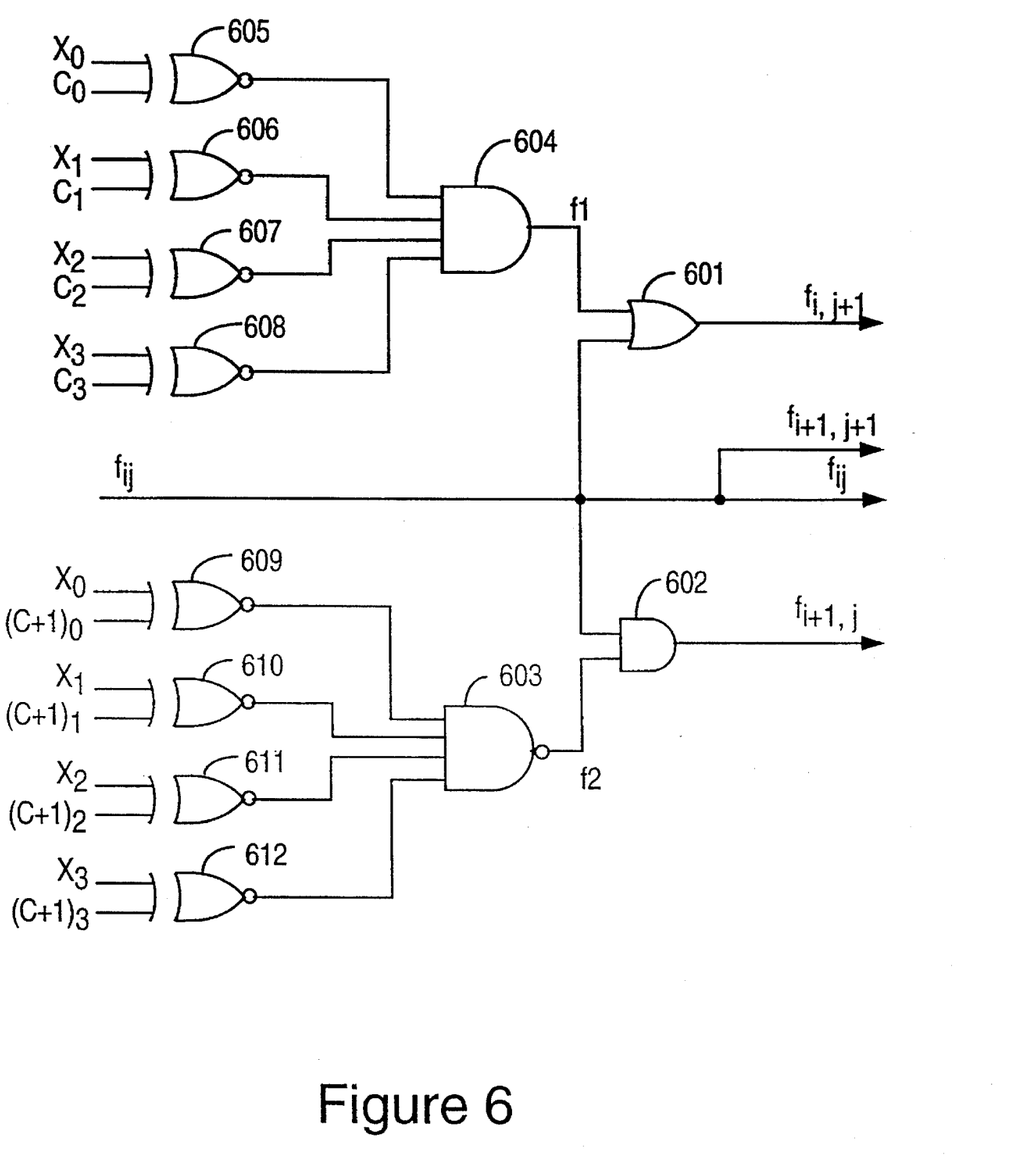
FIG. 6 shows a circuit diagram of a portion of a look ahead signal generator used to generate flags indicating that the difference between the read and the write pointer values is greater than a constant C.

The look ahead signal generator of FIG. 6 generates the four flag signals $f_{i,j}$, $f_{i,j+1}$, $f_{i+1,j}$, $f_{i+1,j+1}$ for the states (i,j), (i,j+1), (i+1,j) and (i+1,j+1). These four flag signal are for input into a signal selector which selects a correct predetermined flag signal as the new output flag when the state of the buffer changes.

As shown in FIG. 6, the current flag value may be used in the calculation of flags of the next set of possible states. In the look ahead method, the flag for the current state (i,j) is predetermined and therefore available.

XNOR gates 605–608 compare signals representing a four bit binary representation of C with the binary representation of $X=j-i$. The signals for $C_0-C_3$ are either VCC or are ground and can be hard wired for a fixed value of C or can be a programmable value read from a memory. The signals $X_0-X_3$ come from a subtractor that subtracts i from j. The output signal from XNOR gate 605 is high if two binary digits $X_0$ and $C_0$ are equal, both low or both high. An output signal $f_1$ from AND gate 604 is high only if all the binary digits are equal.

The logic circuit of FIG. 6 assumes that C and X are four bit numbers. If C and X contain more than four bits then more XNOR gates are needed, and the number of inputs of the AND gate 604 and NAND gate 603 need to be increased. The rest of the circuit remains unchanged.

OR gate 601 sets the signal $f_{i,j+1}$ high if $f_{i,j}$ is high or if $f_1$ is high. That the flag signal is correct is shown by simple relationships, if j−i>C then (j+1)−i>C or if j−i=C then (j+1)−i=C+1>C.

The inputs signals on the XNOR gates 609–612 are binary digits of X and (C+1). The output signal $f_2$ of NAND gate 603 is high unless X=C+1. AND gate 602 sets flag signal $f_{i+1,j}$ high if $f_{i,j}$ is high and X does not equal C+1. Again arithmetic relationships show that this is the correct logic. If j−i=C+1>C then j−(i+1)=C and is not greater than C, but if j−i>C and j−i does not equal C+1 then j−i>C+1, because j−i is an integer, and j−(i+1) =(j−i)−1>(C+1)−1=C.

Although the above paragraphs dealt with a flag such as a half full or almost full flag that was set when the difference between pointers is greater than some value C, the technique applies to flags that are set when the difference between pointer values is greater than or equal to, less than, or less than or equal to a value C. The "greater than or equal to C" flags are equivalent to "greater than C−1" flags, since pointer are integer values. The "less than C" flags such as an almost empty flag can be generated by inverting the value of "greater than C−1" flag.

The look ahead circuits and methods described above have mostly been described in connection with a FIFO buffer. It should be apparent that the invention can be more generally applied to other systems that need to generate status flags.

Although the present invention has been described in detail, the description is only illustrative and not limiting. Other embodiments of this invention will be obvious in view of this disclosure to those skilled in the relevant arts.

I claim:

1. A method for changing a flag signal which a first-in first-out buffer transmits to indicate a status of the first-in first-out buffer, the method comprising:

predetermining possible flag signals corresponding to possible new states of the first-in first-out buffer, such that each possible flag signal indicates the status that the first-in first-out buffer would have in the corresponding possible new state;

selecting one of the possible flag signals to be the flag signal when the state of the first-in first-out buffer changes from an old state to a new state; and transmitting the selected signal to a device that communicates through the first-in first-out buffer.

2. The method of claim 1, wherein predetermining possible flag signals comprises:

generating a first possible flag signal corresponding to a state that the first-in first-out buffer would have after a read operation;

generating a second possible flag signal corresponding to a state that the first-in first-out buffer would have after a write operation; and generating a third possible flag signal corresponding to a state that the first-in first-out buffer would have after a read operation and a write operation.

3. The method of claim 2, wherein selecting one of the possible flag signals comprises:

applying a flag signal corresponding to a current state of the first-in first-out buffer to an input lead of a multiplexer;

applying the first, second, and third possible flag signals to other input leads of the multiplexer;

applying a select signal to the multiplexer, wherein in response to the select signal the multiplexer selects the flag signal corresponding to the current state for long as the first-in first-out buffer remains in the current state, but when the state of the first-in first-out buffer changes to the new state, the select signal changes and the multiplexer selects the one of the possible flag signal which corresponds to the new state.

4. The method of claim 2, wherein the flag signal indicates whether a difference between a write pointer and a read pointer for the first-in first-out buffer is greater than a constant, and wherein predetermining the possible flag signals comprises:

determining the difference between the write pointer and the read pointer; and determining whether the difference is equal to the constant, wherein if the difference is equal to the constant, the second possible flag signal indicates that after a write, the difference between the write pointer and the read pointer would be greater than the constant.

5. The method of claim 4, wherein if the flag signal indicates that the difference is greater than the constant, the second possible flag signal indicates that following a write, the difference between the write pointer and the read pointer would be greater than the constant.

6. The method of claim 4, wherein predetermining the possible flag signals further comprises:

determining whether the difference equals the constant plus one; and if the flag signal indicates that the difference is greater than the constant and if the difference is not equal to the constant plus one, then the first possible flag signal indicates that after a read, the difference between the write pointer and the read pointer would be greater than the constant.

7. The method of claim 4, wherein the flag signal is used to indicate whether the difference between the write pointer and the read pointer is greater than or equal to the constant minus one.

8. The method of claim 4, wherein the flag signal is used to indicate whether the difference between the write pointer and the read pointer is less than the constant plus one.

9. The method of claim 2, wherein the flag signal indicates whether a difference between a write pointer and a read pointer for the first-in first-out buffer is less than a constant, and wherein if the flag signal indicates the difference is less than the constant, the first possible flag signal indicates that after a read, the difference between the write pointer and the read pointer would be less than the constant.

10. The method of claim 2, wherein generating the third possible flag signal comprises generating a possible flag signal which is equal to the flag signal.

11. The method of claim 4, wherein if the flag signal does not indicate that the difference is greater than the constant and if the difference is not equal to the constant, the second possible flag signal indicates that following a write, the difference between the write pointer and the read pointer would not be greater than the constant.

12. The method of claim 2, wherein a set including the flag signal, the first possible flag, the second possible flag signal, and the third possible flag signal is in one-to-one correspondence with a set including a state in which a read pointer and a write pointer of the first-in first-out buffer are both even, a state in which the read and write pointers are both odd, a state in which the read pointer is even and the write pointer is odd, and a state in which the read pointer is odd and the write pointer is even, and wherein selecting one of the possible flag signals comprises:

applying the flag signal to an input lead of a multiplexer;

applying the first, second, and third possible flag signals to other input leads of the multiplexer;

applying a select signal to select lines of the multiplexer wherein the select signal indicates whether the read pointer is odd or even and whether the write pointer is odd or even.

13. The method of claim 1, wherein the flag signal indicates whether the first-in first-out buffer is empty.

14. The method of claim 1, wherein the flag signal indicates whether the first-in first-out buffer is full.

15. The method of claim 1, wherein the flag signal indicates a relationship between the amount of data in the first-in first-out buffer and a constant amount.

16. A method for changing a flag signal output from a first-in first-out buffer, the method comprising:

generating a first signal for a first state in which a read pointer and a write pointer in the first-in first-out buffer are both even;

generating a second signal for a second state in which the read pointer and the write pointer are both odd;

generating a third signal for a third state in which the read pointer is even and the write pointer is odd;

generating a fourth signal for a fourth state in which the read pointer is odd and the write pointer is even; and selecting one of the first, second, third, and fourth signals to be the flag signal, wherein the selection is made according to whether the read pointer is odd or even and whether the write pointer is odd or even.

17. The method of claim 16, wherein each of the first, second, third, and fourth states corresponds to one of a current state of the first-in first-out buffer, a state reached after a read from the first-in first out buffer, a state reached after a write to the first-in first out buffer, and a state reached after a read and a write.

18. The method of claim 16, wherein:

generating the first signal comprises indicating the state that the first-in first-out buffer has if the read pointer is equal to a first even value and the write pointer is equal to a second even value;

generating the second signal comprises indicating the state that the first-in first-out buffer has if the read pointer is equal to a first odd value and the write pointer is equal to a second odd value;

generating the third signal comprises indicating the state that the first-in first-out buffer has if the read pointer is equal to the first even value and the write pointer is equal to the second odd value; and generating the fourth signal comprises indicating the state that the first-in first-out buffer has if the read pointer is equal to the first odd value and the write pointer is equal to the second even value; and the method further comprises:

alternating changing the first even value and changing the first odd value in response to reads from the first-in first-out buffer; and alternating changing the second even value and changing the second odd value in response to writes to the first-in first-out buffer.

19. The method of claim 16, wherein selecting one of the first, second, third, and fourth signals comprises:

applying the first, second, third, and fourth signals to input leads of a multiplexer; and applying a select signal to select leads of the multiplexer wherein the select signal indicates whether the read pointer is odd or even and whether the write pointer is odd or even.

* * * * *